Patented Sept. 18, 1945

2,384,916

UNITED STATES PATENT OFFICE 2,384,916

METHOD OF PRODUCING HIGH MOLECULAR WEIGHT ISO-OLEFIN POLYMERS

Robert L. Holmes, Roselle, N. J., assignor, by mesne assignments, to Jasco, Incorporated, a corporation of Louisiana No Drawing. Application June 15, 1940, Serial No. 340,781

11 Claims. (Cl. 260—93)

The present invention relates to a method of promoting polymerization of olefins, particularly iso-olefins, at low temperatures by addition of small percentages of certain oxygen-containing compounds.

The high molecular weight hydrocarbon polymers of linear or chain type prepared from iso-olefins, such as isobutylene, or from mixtures of olefins containing essentially iso-olefins, are useful for many industrial purposes. It has been found desirable to produce these polymers in the best yields, with greatest uniformity, and with the highest molecular weights obtainable under any set of operating conditions which can be used economically and practically.

The average molecular weight of polymers formed from olefins at low temperatures, ranging downwardly from −10° C. with intervention of an active inorganic halide catalyst, such as boron fluoride or aluminum chloride, is dependent on several known factors; namely, the purity of the olefin reactant, temperature of the reaction, nature and amount of the catalyst, and manipulations for controlling the rate of reaction and the reaction conditions. Even in utilizing such factors to the best advantage, it is of added benefit to further the reaction by any other means which can be readily employed. For instance, when purified isobutylene, with all known inhibiting impurities reduced to mere traces, is polymerized at temperatures in the neighborhood of −78° C. using carbon dioxide snow as an internal refrigerant, and other known means for controlling the reaction conditions, such as agitation, and diluents with optimum amounts of boron fluoride catalyst, the maximum yield of a polymer having an average molecular weight of about 91,500 amounts to about 69.0%. This product contains polymers with molecular weights which vary from the average to a substantial degree and it is difficult to improve upon the product by any variation of the known factors. It is, therefore, a decided improvement upon the process if any other factor can be ascertained, particularly any which does not entail far reaching changes in operating conditions nor complicate the manipulations in carrying out the reaction.

In the past, oxygen-containing compounds, in general, have been regarded as poisons in the reaction and it is still definitely true that unless oxygen-containing compounds of various types which are likely to be present in the ordinary initial olefin reactant materials are eliminated or reduced to mere traces, these compounds are very harmful in reducing the yield and lowering the grade of the polymer. Particularly, with boron fluoride as the catalyst and polymerization temperatures of the order of −40° C. to −103° C., a number of low boiling aldehydes and fatty acids should not be present in amounts greater than 0.1%, and even some low boiling alcohols cannot be tolerated as impurities above .05% or 0.1% under these conditions. As a rule, these various classes of oxygen-containing compounds have pronounced detrimental effects on the polymerization in concentrations of less than 1% by weight, and in higher amounts such oxygenated compounds even completely destroy the activity of the catalyst.

It is now found, in accordance with the present invention, that certain classes of oxygen-containing aliphatic compounds or particular members of these classes in certain limited concentrations act very efficiently as promoters in raising the molecular weight and yield of the polymer under determined reaction conditions. Thus, it is an object of the present invention to improve the polymerization procedure by the utilization of these promoters and thereby obtain the increased yields of higher molecular weight products. Other objects and details of the invention will be apparent from the following description.

In the formation of high molecular weight hydrocarbon polymers from normally gaseous olefin-containing fractions, particularly such fractions which contain essentially an iso-olefin, the polymerization is catalyzed by inorganic halides, such as boron fluoride, aluminum chloride, zinc chloride, and other highly active halides of the Friedel-Crafts type. The readily volatilizable compounds of this type, e. g., boron fluoride ($BF_3$), have been preferred in order to obtain the polymers of high molecular weight, that is, of the order of 15,000 and higher. It is necessary that the polymerization take place at low temperatures, for example, below −10° C., and preferably at much lower temperatures; for example, −40° C., −78° C., or even at low as −103° C., and to maintain the predetermined low temperature during the entire course of the reaction.

The generation of heat during polymerization is considerable, and if special care is not taken to maintain the temperature at the pre-determined degree, the temperature of the reaction mixture rises rapidly and this change prevents the formation of the desired high molecular weight polymers and makes the polymers non-uniform.

For the purpose of imparting to the reaction mixture a desired low temperature and maintaining control of this temperature, it has been found desirable to have the reaction take place in the presence of an inert diluent, an inert internal refrigerant, such as carbon dioxide snow, or an inert diluent which volatilizes in the reaction zone, or a mixture of such a refrigerant and diluent. Accordingly, the reaction conditions are governed by the physical properties of the diluent or the refrigerant, that is, the temperature at which the reaction mixture will tend to correspond to the boiling point of the diluent or sublimation point of the refrigerant in case it is a solid, such as carbon dioxide snow. As an inert diluent may be mentioned liquefied ethane, propane, butane, or higher boiling paraffinic hydrocarbons. Olefinic hydrocarbons, such as ethylene or propylene may be used as diluents with iso-olefins, since under the low temperature reaction conditions these normal olefins having molecular weights no higher than the reactant remain substantially inert. On the other hand, higher molecular weight mono-olefins, e. g., diisobutenyl, and different types of unsaturated hydrocarbons, e. g., a diolefin, such as isoprene, in an amount ranging from about .1% to 1%, or more, act as inhibitors.

The olefin reactant fraction may be obtained from several different sources; first, from uncondensed gases obtained in cracking a petroleum oil. These gases can be fractionated to obtain any particular cut. Thus, to prepare polybutenes, the C₄ cut, which largely contains isobutylene, is recovered to be used in the polymerization. But such fractions of normally gaseous hydrocarbons are apt to contain in addition to olefins and paraffins having about 4 carbon atoms per molecule, some olefins of higher molecular weight and relatively small amounts of sulfur in various forms. The iso-olefins may also be obtained as by-products of methanol synthesis. The material obtained from this source is apt to contain other olefins and small amounts of oxygen-containing compounds. Next in importance to isobutylene, the iso-olefins having 5 carbon atoms per molecule, e. g., iso-amylene, and the methyl butenes, are useful analogously for preparing high molecular weight polymers.

It should be understood that, depending upon the source of raw materials, they will be subjected to a particular purification treatment which is calculated to reduce the content of undesirable impurities to the extent that these impurities are innocuous in the polymerization. Impurities of molecular weights which differ substantially from the molecular weight of the desired reactant can be separated by distillation. When the similarly in boiling points of the impurities do not permit separation by distillation, it is necessary to remove the impurities by a chemical treatment; for example, by treating the hydrocarbon fraction with sulfuric acid of say 50% to 70% strength at temperatures in the range of 0° C. to —20° C. Using this chemical treatment, the iso-olefins can be selectively polymerized to a low molecular weight polymer, such as a dimer and trimer, and in this form be separated from the original material by distillation. Subsequently, the separated low molecular weight polymer can be de-polymerized to recover the monomer either through thermal decomposition, alone, or with the aid of a cracking catalyst, such as a clay type catalyst.

Sulfur compound impurities may be removed in a variety of ways, depending upon the particular type of sulfur. Mercaptans, for example, are ordinarily removed by washing with caustic soda or other known reagents. Di-sulfides may be removed by treatment with metals or their compounds. Oxygen-containing compounds, such as alcohols, are best removed by careful distillation, although it may be necessary in some instances to re-distill several times to reduce this impurity to below a tolerated maximum.

The purification method is, therefore, a combination of such methods, depending on the particular impurities present in the material. Furthermore, as it is usually desirable to conduct the polymerization in the presence of an inert solvent, it is found that among by-products of the reaction formed through decomposition of the halide catalyst, there are some which, if present in the recirculated solvent, would act as poisons, as for example, some aliphatic halides. The undesirable by-products may be removed by careful distillation of the solvent or by the use of selective adsorbents, such as activated carbon.

It will be understood that a relatively high degree of purification, at least in respect to the substances mentioned, is necessary to prepare an olefin reactant stock from which high molecular weight polymers are to be produced. It is difficult to analyze the exact amounts of impurities which can be tolerated, but it may be stated that as a result of carefully conducted experiments many of the sulfur-, oxygen-, and halogen-containing organic compounds, and also some unsaturated hydrocabons, which tend to be present in the initial materials or be formed in the course of the polymerization have a very adverse effect on the polymerization if present in concentrations as high as 0.10% to 1%.

To many of these impurities, the polymerization reaction is very sensitive. It has been found that as little as 0.01% of inhibitors such as mercaptans, sulfides, and some oxygen-containing compounds, except in isolated instances, is the most that can be tolerated, and that even in such small amounts as this, the inhibiting impurities may tremendously lower the molecular weight and yield of the polymer product.

Certain types of oxygen-containing compounds which have been discovered to act as promoters effect the polymerization in a manner precisely opposite from that imputed to the poisons, provided these promoting agents are present in limited concentrations and the reaction is carried out under conditions which have been determined.

The low boiling aliphatic ethers, certain of the low boiling aliphatic ketones, and low boiling esters have been found to act as promoters in optimal concentrations of from about 0.01% to about 1.0% by weight of the reactant in the polymerization conducted at temperatures in the range from about —10° C. to about —103° C. These promoters may be represented as having the general formulae:

wherein R and R' represent alkyl radicals, similar or dissimilar. The compounds of any of these classes preferably should contain a total of less than 11 carbon atoms per molecule and one of the alkyl radicals should have from 2 to 5 carbon atoms. Thus, the aliphatic ethers having from 4 to 10 carbon atoms per molecule are all highly efficient promoters. The esters and ketones are mostly suitable when they have mixed alkyl groups, e. g., a smaller alkyl radical of 1 to 2 carbon atoms and a larger alkyl group of 2 to 5 carbon atoms.

A large number of laboratory and plant experiments for investigating this invention have been carried out to determine the promoting effectiveness of the various compounds and also the relative effects of other compounds as promoters and as inhibitors. In these experiments, the known methods of regulating the temperature of the reaction were used and highly purified olefin reactants were treated with the halide polymerization catalyst as has been described. These experiments are illustrated by the following examples:

EXAMPLE 1

25 cc. of purified isobutylene was polymerized with boron fluoride used as the catalyst, the isobutylene being internally refrigerated with 75 gm. of powdered carbon dioxide snow, sufficiently comminuted to pass a 20 mesh screen. After the reaction subsided, the resulting polymer product was tested for molecular weight by the viscosity method. A series of samples of the purified isobutylene were polymerized in the same manner, except that small amounts of isopropyl ether were added, and the molecular weights of the products were obtained for a comparison.
The results were as follows:

*Table 1*

| Weight per cent isopropyl ether added to isobutylene reactant | Polymer product | |
|---|---|---|
| | Per cent yield | Molecular weight |
| 0.0 | 69.0 | 91,500 |
| 0.0 | 71.5 | 89,500 |
| 0.1 | 75.4 | 122,000 |
| 0.2 | 83.7 | 131,000 |
| 0.5 | 70.7 | 127,000 |
| 1.0 | 57.3 | 119,000 |

It can be seen from the foregoing table that the addition of 0.2% of isopropyl ether results in an increase of 39,000 in molecular weight and a 10% increase in yield. It can also be observed that the optimum concentration for isopropyl ether as a promoter lies somewhere in the range of 0.1% to 0.5% and that upon increasing the concentration of the promoter above about 1.0% tends to decrease the yield and molecular weight rapidly.

EXAMPLE 2

A series of experiments were carried out in plant equipment used to produce isobutylene polymers using conditions set forth in Example 1. Small amounts, less than 0.1%, of isopropyl ether resulted in a definite increase in the molecular weight, lower catalyst consumption, and an increase yield of polymer. The results are tabulated as follows:

*Table 2*

| Per cent isopropyl ether added to isobutylene | Per cent by weight of catalyst | Molecular weight of polymer | Molecular weight after washing and drying | Per cent yield |
|---|---|---|---|---|
| 0.00 | 0.1 | 72,000 | 57,000 | 70 |
| 0.045 | 0.02 | 109,000 | 81,500 | 83 |
| 0.045 | 0.02 | 110,000 | | |
| 0.09 | 0.02 | 106,000 | 92,000 | 81 |
| 0.09 | 0.02 | 90,500 | | |

It can be seen from Table 2 that even when one-fifth the amount of catalyst was used, the added isopropyl ether promoter increased the yield by 10% and the average molecular weight by 30,000 and better.

A series of other experiments were carried out in testing other aliphatic ethers, a number of low boiling acetates and ketones in a manner similar to that described in the foregoing examples. In this series of experiments, the isobutylene was reacted under conditions to result in the formation of a polymer having a molecular weight of 102,000 in the absence of a promoter. Separate samples of the isobutylene were polymerized in the presence of different concentrations of each promoter and the molecular weight of the polymer products were determined in a comparable manner to obtain the data which is tabulated as follows:

*Table 3*

| Promoter added; Type—Compound | Deviation in molecular weight of polymer product from 102,000 (deviation with multiplying factor × 1,000) | | |
|---|---|---|---|
| Weight per cent promoter added = | 0.5 | 0.2 | 0.1 |
| Ethers: | | | |
| Ethyl | +33 | +22 | +38 |
| Normal propyl | +21 | +18 | +11 |
| Isopropyl | +27 | +31 | +22 |
| Normal butyl | +11 | +25 | +15 |
| Methyl normal butyl | +29 | +28 | +29 |
| Isoamyl | +18 | +12 | +1 |
| Acetates: | | | |
| Isopropyl | +14 | +3 | +25 |
| Normal butyl | +4 | +18 | +15 |
| Secondary butyl | +12 | +2 | +9 |
| Ketones: | | | |
| Methyl ethyl | −14 | +12 | +32 |
| Methyl propyl | +15 | +10 | +30 |
| Methyl butyl | −6 | +16 | +21 |

It can be seen from the foregoing Table 3 that, in general, each of the promoters acts most effectively in a concentration ranging from about 0.1% to 0.5%, but that some of the compounds behave exceptionally in tending to increase in effectiveness as the concentration reaches 0.5%. However, under the same conditions and in the same range of concentrations, many other types of compounds act in just the reverse manner to the same degree. This is illustrated in the case of low boiling alcohols, acids, and aldehydes, several aliphatic halides, and, in general, by sulfur-containing compounds.

As already indicated in the case of isopropyl ether, the foregoing described promoters likewise after reaching a maximum effectiveness for a certain concentration begin to act adversely with increase in concentration. This relationship of concentration to effectiveness is further illustrated by experiments carried out in the following manner:

EXAMPLE 3

Purified isobutylene was polymerized with boron fluoride as the catalyst and internally refrigerated with powdered carbon dioxide ice of 10 mesh and finer, using a 5:1 Dry Ice to liquid ratio. The polymer product was approximately 94,000 molecular weight. Using the same quality of isobutylene and adding compounds to be tested as promoters, the molecular weights of the polymer products were formed and tested under comparable conditions, and the results are shown as follows:

*Table 4*

| Compound added | Percent of compound added | Molecular weight of polymer product |
|---|---|---|
| None | | 94,800 |
| Do | | 93,400 |
| Ethyl ether | 0.1 | 124,500 |
| Do | 0.5 | 79,600 |
| Do | 1.0 | 71,400 |
| Do | 2.0 | 50,800 |

In the manner illustrated in Table 4, the promoters which have been described enhance the results of the polymerization up to a certain degree in limited concentrations and then tend to act adversely.

Another significant advantage of the promoters is the fact that they are able to promote the catalytic polymerization, even in the presence of substances which act as poisons and, therefore, can offset the inhibiting action of the poison. For example, the promoters increase polymerization of the iso-olefin in the presence of a diolefin, such as isoprene, with boron fluoride as the catalyst. This is illustrated by tests in which the isobutylene reactant polymerized under conditions as described in Example 3, which would normally result in a polymer product having a molecular weight of approximately 94,000, was polymerized under the same conditions with the addition of 0.25% of isoprene that acted as an inhibitor and then in the presence of the same proportion of isoprene with 0.5% of isopropyl ether added as a promoter. The results were as follows:

*Table 5*

| Compound added to isobutylene | Promoter per cent added | Molecular weight of polymer product |
| --- | --- | --- |
| None | | 94,000 |
| Isoprene (0.25%) | | 25,600 |
| Isoprene (0.25%) and isopropyl ether | 0.5 | 45,400 |

It is to be observed that the promoter approximately doubles the molecular weight of the resulting polymer formed in the presence of isoprene which normally acts as an inhibitor. Thus, the promoters in effective promoting concentrations give the desired improvement in a polymer product, even when the polymerizable olefinic reactants contain small amounts of impurities or are mixed with small amounts of polymerizable unsaturated hydrocarbons other than the monomer which is to be essentially polymerized. This is a very useful feature of the invention in that it aids in overcoming the difficulties of completely purifying the initial reactant material.

While there have been disclosed a limited number of embodiments of the present invention for the purpose of description, still other embodiments come within the spirit of the invention as defined in the appended claims.

I claim:

1. In the process of producing high molecular weight hydrocarbon polymers from an iso-olefin by treatment with an active inorganic halide polymerization catalyst of the Friedel-Crafts type at temperatures ranging from about −40° C. to about −103° C., the improvement which comprises polymerizing the iso-olefin substantially free from impurities which inhibit the reaction and with an addition of from about 0.01% to about 1% of an aliphatic ether having from 4 to 10 carbon atoms per molecule.

2. The process as described in claim 1, in which the added ether is isopropyl ether.

3. The process as described in claim 1, in which the added ether is ethyl ether.

4. The process as described in claim 1, in which the added ether is methyl normal butyl ether.

5. The process as described in claim 1, in which the iso-olefin polymerized contains from 4 to 5 carbon atoms per molecule.

6. Process of forming high molecular weight polymers form isobutylene which comprises polymerizing the isobutylene at below −10° C. with a boron fluoride catalyst in the presence of an aliphatic ether containing from about 4 to 10 carbon atoms per molecule admixed in an amount of 0.01% to 1% by weight of the isobutylene.

7. In the process of polymerizing an iso-olefin reactant to form high molecular weight polymers at reaction temperatures below −10° C. in the presence of a Friedel-Crafts type halide catalyst, the improvement which comprises polymerizing the reactant in the presence of a small but effective reaction promoting amount of an admixed aliphatic oxygen-containing compound selected from the class consisting of ethers, esters, and ketones, having a total of less than 11 carbon atoms per molecule with from 2 to 5 carbon atoms in one alkyl group, the concentration of said aliphatic oxygen-containing compound being in the range of about 0.01% to about 1% by weight of the reactant.

8. In the process of producing high molecular weight hydrocarbon polymers from isobutylene by treatment with boron fluoride catalyst at temperatures ranging from about −40° C. to about −103° C., the improvement which comprises polymerizing the isobutylene substantially free from impurities which inhibit the reaction and with an addition of from about 0.01% to about 1% of an aliphatic ether having from 4 to 10 carbon atoms per molecule.

9. In a process of producing high molecular weight polymers by polymerization of unsaturated hydrocarbon reactants containing principally isobutylene and a small proportion of a diolefin at a reaction temperature below −10° C. in the presence of a Friedel-Crafts halide type catalyst, the improveemnt which comprises polymerizing the unsaturated hydrocarbon reactants with an addition of an aliphatic ether having from 4 to 10 carbon atoms per molecule in a polymerization promoting concentration of less than about 1%.

10. A process as described in claim 9, in which the diolefin is isoprene.

11. A process as described in claim 9, in which said catalyst is boron fluoride.

ROBERT L. HOLMES.